(12) United States Patent
Sautermeister et al.

(10) Patent No.: US 11,366,002 B2
(45) Date of Patent: Jun. 21, 2022

(54) METHOD FOR DETECTING A FAULT STATE AT AN FMCW-BASED FILLING LEVEL MEASURING DEVICE

(71) Applicant: Endress+Hauser SE+Co. KG, Maulburg (DE)

(72) Inventors: Manuel Sautermeister, Schopfheim (DE); Winfried Mayer, Buch (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 414 days.

(21) Appl. No.: 16/476,723

(22) PCT Filed: Dec. 8, 2017

(86) PCT No.: PCT/EP2017/082038
§ 371 (c)(1),
(2) Date: Jul. 9, 2019

(87) PCT Pub. No.: WO2018/127356
PCT Pub. Date: Jul. 12, 2018

(65) Prior Publication Data
US 2019/0360853 A1 Nov. 28, 2019

(30) Foreign Application Priority Data

Jan. 9, 2017 (DE) ...................... 10 2017 100 269.3

(51) Int. Cl.
*G01F 23/284* (2006.01)
*G01F 25/20* (2022.01)

(52) U.S. Cl.
CPC ............ *G01F 25/20* (2022.01); *G01F 23/284* (2013.01)

(58) Field of Classification Search
CPC .......................... G01F 25/0061; G01F 23/284
See application file for complete search history.

(56) References Cited

U.S. PATENT DOCUMENTS

| 6,684,919 B2 * | 2/2004 | Gaiser | G01F 23/284 |
| | | | 73/290 R |
| 2009/0013778 A1 * | 1/2009 | Schroth | G01F 23/284 |
| | | | 73/290 V |

(Continued)

FOREIGN PATENT DOCUMENTS

| CN | 1535374 A | 10/2004 |
| CN | 101825486 A | 9/2010 |

(Continued)

OTHER PUBLICATIONS

Porter et al., "Savitzky-Golay interpolation for smoothing values and derivatives", Vector, the Journal of the British APL Association, vol. 25, No. Nov. 4, 2012 p. 107 (Year: 2012).*

*Primary Examiner* — Regis J Betsch
(74) *Attorney, Agent, or Firm* — Christopher R. Powers; Endress+Hauser (USA) Holding Inc.

(57) ABSTRACT

The present disclosure relates to a method for detecting a fault state at an FMCW-based fill level measuring device, including performing two reference measurements successively in time, a first reference measurement signal and a second reference measurement signal, using the filling level measuring device under a predefined reference measurement condition. In each of the two reference measurement signals a characteristic parameter is determined, wherein a change in the characteristic parameter over time is determined by comparing the two reference measurement signals. A fault state is detected when the change in the characteristic parameter exceeds a predefined maximum characteristic parameter change.

13 Claims, 5 Drawing Sheets

(56) References Cited

U.S. PATENT DOCUMENTS

| | | | |
|---|---|---|---|
| 2009/0273506 A1* | 11/2009 | Delin | G01F 23/80 |
| | | | 342/124 |
| 2013/0213132 A1* | 8/2013 | Wegemann | G01F 23/284 |
| | | | 73/290 V |
| 2016/0245909 A1 | 8/2016 | Aslett et al. | |
| 2016/0292893 A1 | 10/2016 | Wennerberg | |

FOREIGN PATENT DOCUMENTS

| | | |
|---|---|---|
| DE | 10255288 A1 | 7/2004 |
| DE | 102005003152 A1 | 7/2006 |
| DE | 102005049500 A1 | 5/2007 |
| DE | 102015202448 A1 | 8/2016 |
| EP | 2442129 A1 | 4/2012 |
| EP | 2631612 A2 | 8/2013 |
| EP | 1328776 B1 | 2/2016 |
| WO | 2009134202 A1 | 11/2009 |

\* cited by examiner

METHOD FOR DETECTING A FAULT STATE AT AN FMCW-BASED FILLING LEVEL MEASURING DEVICE

CROSS-REFERENCE TO RELATED APPLICATIONS

The present application is related to and claims the priority benefit of German Patent Application No. 10 2017 100 269.3, filed on Jan. 9, 2017 and International Patent Application No. PCT/EP2017/082038, filed on Dec. 8, 2017, the entire contents of which are incorporated herein by reference.

TECHNICAL FIELD

The invention relates to a method for detecting an error state of an FMCW-based fill level measuring device, and to a fill level measuring device suitable for carrying out this method.

BACKGROUND

In automation technology—in particular, in process automation technology—field devices serving to detect and/or modify process variables are frequently used. In order to detect process variables, sensors are used, which are, for example, used in fill level measuring devices, flow rate measuring devices, pressure and temperature measuring devices, pH redox potential measuring devices, conductivity measuring devices, etc. They detect the respective process variables, such as the fill level, flow rate, pressure, temperature, pH value, redox potential, or conductivity. A variety of such field devices is manufactured and marketed by the Endress+Hauser company.

Contactless measuring methods have become established for the fill level measurement of filling materials in containers, since they are robust and low-maintenance (the term "containers" in the context of the invention also means non-sealed containers, such as, for example, basins, lakes or flowing bodies of water). Another advantage of contactless measuring methods lies in their ability to measure the fill level (L) virtually continuously, in other words, at a very high resolution. Accordingly, radar-based measuring methods are predominantly used for this purpose. An established measuring principle is the FMCW measuring principle ("frequency-modulated continuous wave"). It is based on the fact that a continuous radar transmission signal is emitted and the reflected radar received signal, which is reflected at the surface of the filling material, is compared with the instantaneous frequency of the transmission signal. Here the frequency of the radar transmission signal lies within a fixed frequency band in the range of a standardized center frequency ($f_0$). The standard frequency bands used here are those in the 6 GHz band, the 26 GHz band, or the 79 GHz band. Characteristic of the FMCW method here is that the transmission frequency is not constant, but changes periodically within a frequency band. The change may in this case be linear and have a sawtooth or triangular shape; however, a sinusoidal change can also be used depending on the application.

In the case of the FMCW-based fill level measuring method, a particular challenge is to be certain of distinguishing the measurement signal from interference signals. Erroneous measured values can be generated due to interference signals from corresponding sources of error, due to which the operability of the filling level measuring device is impaired. A major cause in this case is the reception of interference signals which are caused by the transmission signal being reflected on disturbing bodies, such as agitators or internal fittings in the container. However, interference signals can also occur within devices, if, for example, the source of error is feedback in the antenna unit.

In the meantime, in the case of FMCW-based fill level measurement many technical approaches now exist for filtering interference signals in order to make correction of the received signal possible. International publication WO 2012/139852 A1 accordingly discloses a method for calibrating FMCW-based fill level measuring devices in which a unique reference measurement signal can be generated—even during normal measuring operation—by means of an oscillating reference reflector which is positioned between measuring device and filling material.

German patent application DE 10 2008 050 117 A1 describes a method for correcting internal interference signals of the fill level measuring device. The method described therein is based on measuring a reference measurement signal in a maximally absorbent test environment, and then generating a correction curve on the basis of the reference signal.

Although interference signals can possibly be compensated by means of the said methods, aging or contamination of the fill level measuring device changes the interference signals over time. It is, therefore, interesting to carry out the correction during ongoing operation and in the event of a change in the compensation values to conclude an error state is present. The detection of such an error state is particularly desirable in the case of fill level measuring devices which are used in critical process equipment for which a high degree of reliability is required. The necessary requirements for such an application are described, for example, in the IEC/EN 61508 standard for functional safety (also known as the safety integrity level or SIL).

SUMMARY

The object of the invention is therefore to provide a method by means of which an error state in FMCW-based fill level measuring devices can be detected.

The invention solves this problem by a method for detecting an error state in an FMCW-based fill level measuring device. It comprises at least the following method steps:

Reference measurement of a first reference measurement signal ($s_{ref1}$, $s_{ZF1}$) under at least one predefined reference measurement condition by the fill level measuring device, Determination of at least one characteristic parameter ($A_{peak}$, $A_{Hüll}$, $f_{peak}$, $f_{mean}$, $\phi$) of the reference measurement signal ($s_{ref1}$, $s_{ZF1}$), Reference measurement of at least one second reference measurement signal ($s_{ref2}$, $s_{ZF2}$) under the at least one predefined reference measurement condition, Determination of a change in at least one characteristic value ($\Delta A_{peak}$, $\Delta A_{Hüll}$, $\Delta f_{peak}$, $\Delta f_{mean}$, $\Delta\phi$) on the basis of at least the first reference measurement signal ($s_{ref1}$, $s_{ZF1}$) and the second reference measurement signal ($s_{ref2}$, $s_{ZF2}$), and Detection of the error state when the change in the characteristic value ($\Delta A_{peak}$, $\Delta A_{Hüll}$, $\Delta f_{peak}$, $\Delta f_{mean}$, $\Delta\phi$) exceeds a predefined maximum change in the characteristic value (e.g. $\Delta A_{peak,max}$).

Within the context of the invention, an error state is defined as a state of the fill level measuring device in which it is not ensured that the fill level measuring device is determining a correct fill level L. Within the context of the invention, the reference measurement signal ($s_{ref1}$, $s_{ZF1}$, $s_{ref2}$, $s_{ZF2}$) in principle is to be understood as any signal which under at least one defined reference condition is transmitted, received and processed by the fill level measuring device in order to determine the fill level L.

The method according to the invention thus makes it possible to detect any error state in the fill level measuring device. In this way it is ensured that the fill level measuring device can be used even in critical process equipment with the high degree of reliability required.

Depending on how the characteristic parameter is defined, according to the invention various interference signals from potential sources of error, which can result in the error state, can be detected. It is not relevant in the context of the invention whether the characteristic parameter results from an internal or from an external (interference) signal of the fill level measuring device. Accordingly, within the context of the invention, it is possible to determine as a characteristic parameter in particular an amplitude ($A_{peak}$) and/or a frequency ($f_{peak}$) of a signal maximum ($s_{peak}$) of the respective reference measurement signal ($s_{ref1}$, $s_{ref2}$), and/or an envelope of the amplitude ($A_{Hüll}$), a phase position ($\phi$) or a frequency of a low-frequency interference ($f_{mean}$) the respective intermediate frequency reference measurement signal ($s_{ZF1}$, $s_{ZF2}$).

Within the context of the invention, a known minimum fill level ($L_{min}$) (or its reaching) (or its attainment) can, for example, be defined as the reference measurement condition. A comparable, likewise conceivable reference measurement condition is that the reference measurement signal is determined as part of a calibration using a defined remote reference object. Alternatively, the reference measurement condition could also be a fully emptied container such that the reference measurement signal does not represent any fill level measured value but only for the most part external interference signals from outside the fill level measuring device. A further conceivable reference measurement condition, in which only internal sources of error of the fill level measuring device are reproduced, is to measure in a test environment in which any electromagnetic waves of the fill level measuring device are absorbed.

A development of the invention provides that, at least on the basis of the at least one characteristic value ($A_{peak}$, $A_{Hüll}$, $f_{peak}$, $f_{mean}$, $\phi$) and its change ($\Delta A_{peak}$, $\Delta A_{Hüll}$, $\Delta f_{peak}$, $\Delta f_{mean}$, $\Delta \phi$), an at least temporal change function (e.g. $dA_{peak}/dt$) is created. Here, for the case whereby the change in the at least one characteristic value ($\Delta A_{peak}$, $\Delta A_{Hüll}$, $\Delta f_{peak}$, $\Delta f_{mean}$, $\Delta \phi$) does not exceed the predefined maximum change in characteristic value (e.g. $\Delta A_{peak,max}$), a remaining operating duration ($\Delta t_r$) before the predefined maximum change in characteristic value (e.g. $\Delta A_{peak,max}$) is exceeded is calculated on the basis of the temporal change function (e.g. $dA_{peak}/dt$).

This development is in other words based on the idea of approximating a remaining time period $\Delta t_r$ by determining the change in at least one specific characteristic parameter via at least two or more reference measurements, up to the duration at which the respective maximum change in characteristic value is likely to be exceeded and the error state of the fill level measuring device will thus occur. A precondition for this is that the change in the corresponding characteristic parameter at the time of the last reference measurement has not yet exceeded the maximum change in characteristic value.

By means of this development of the invention, an error state can thus already be predicted in advance in accordance with the principle of "predictive maintenance". Here, one possibility for determining the change function (e.g. $dA_{peak}/dt$) is to use a regression, in the simplest case a linear regression. In general, however, the choice of a suitable regression type (i.e. exponential, logarithmic, etc. as well) within the meaning of the invention is not limited to linear regression, but rather depends on the individual course of the change in a particular characteristic parameter. Accordingly, the method of least squares can be used to perform the regression and/or to determine a suitable regression type.

In particular, in order to determine a change function (e.g. $dA_{peak}/dt$) more accurately, it is advantageous according to the invention if in each case not only a second, but additionally a further reference measurement signal ($s_{ref3}$–$s_{refn}$) is determined as soon as the at least one predefined reference measurement condition prevails again.

Within the context of the invention it is also possible to create a first correction curve by means of the first reference measurement signal ($s_{ref1}$, $s_{ZF1}$) and a second correction curve by means of the second reference measurement signal ($s_{ref2}$, $s_{ZF2}$). By means of the respective correction curve, the measurement signal, on the basis of which the fill level L is determined in the regular measuring operation, could be corrected by the interferences appearing in the reference signals ($s_{ref1}$, $s_{ZF1}$, $s_{ref2}$, $s_{ZF2}$).

In this case, it is also possible, according to the invention, to determine the change in the at least one characteristic value ($\Delta A_{peak}$, $\Delta A_{Hüll}$, $\Delta f_{peak}$, $\Delta f_{mean}$, $\Delta \phi$) not (exclusively) on the basis of the reference measurement signals ($s_{ref1}$, $s_{ref2}$, $s_{ZF1}$, $s_{ZF2}$), but (possibly additionally) on the basis of the first correction curve and the second correction curve.

The object underlying the invention is achieved analogously to the method according to the invention by a fill level measuring device which is suitable for carrying out the method described above in at least one of these variants. Accordingly, it comprises at least:

A signal generation unit (11) for generating a radar transmission signal ($s_{HF}$)

a transmitting antenna (14) and/or a receiving antenna (15) for transmitting the transmission signal ($s_{HF}$) and/or for receiving a radar received signal ($E_{HF}$), a mixer (17) for generating an intermediate frequency signal ($s_{ZF1}$, $s_{ZF2}$) by mixing the transmission signal ($s_{HF}$) with the received signal ($E_{HF}$), and an evaluation unit (19) for determining a measurement signal and/or reference measurement signals ($s_{ref1}$, $s_{ref2}$) by means of the intermediate frequency signal ($s_{ZF1}$, $s_{ZF2}$), and/or for determining a fill level (L) based on the measurement signal, and/or for determining an error state based on the reference measurement signals ($s_{ref1}$, $s_{ref2}$ $s_{ZF1}$, $s_{ZF2}$).

BRIEF DESCRIPTION OF THE DRAWINGS

The invention will be explained in more detail below with reference to the following figures. The following is shown.

DETAILED DESCRIPTION

Figure 1:
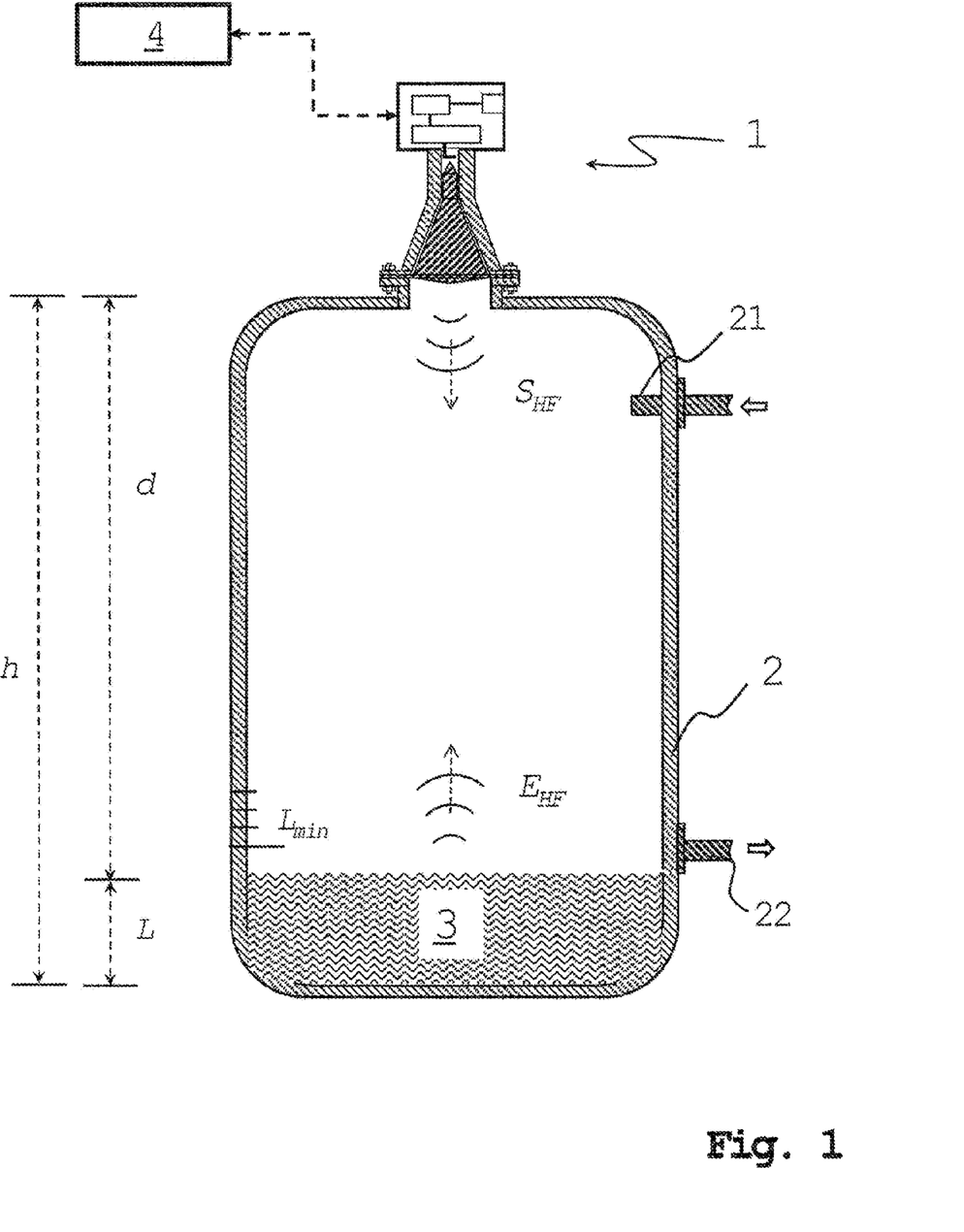
FIG. 1 shows a standard arrangement of an FMCW-based fill level measuring device on a container.

To assist in understanding the method according to the invention, a typical arrangement of a fill level measuring device 1 on a container 2 and operating according to the FMCW measuring principle is shown first in FIG. 1. In the container 2 there is a filling material 3, whose level L is to be determined by the fill level measuring device 1. For this purpose, the fill level measuring device 1 is mounted on the container 2 above the filling material 3 at a known installation height h. Depending on the application, the container 2 can be up to more than 30 m high.

The fill level measuring device 1 is arranged on the container 2 in such a way that in the direction of the surface of the filling material 3 it emits a radar transmission signal $s_{HF}$ typical of FMCW. After reflection of the radar transmission signal $s_{HF}$ at the filling material surface (or undesirably at a disruptive body inside the container 2, such as, for example, an inflow pipe 21 projecting into the container), the fill level measuring device 1 receives a radar received signal $E_{HF}$. In this case, as is characteristic of FMCW, the frequency difference between the currently emitted radar transmission signal $s_{HF}$ and the radar received signal $E_{HF}$ is dependent on the distance d=h−L to the filling material surface.

As a rule, the fill level measuring device 1 is connected via a bus system, such as "PROFIBUS", "HART" or "Wireless HART" to a superordinate unit 4, such as a process control system. Information about a possible error state of the fill level measuring device can on the one hand be communicated via this. On the other hand information about the fill level L can also be transmitted in order to control any inflows 21 and/or outflows 22 that may be present on the container 2.

Figure 2:
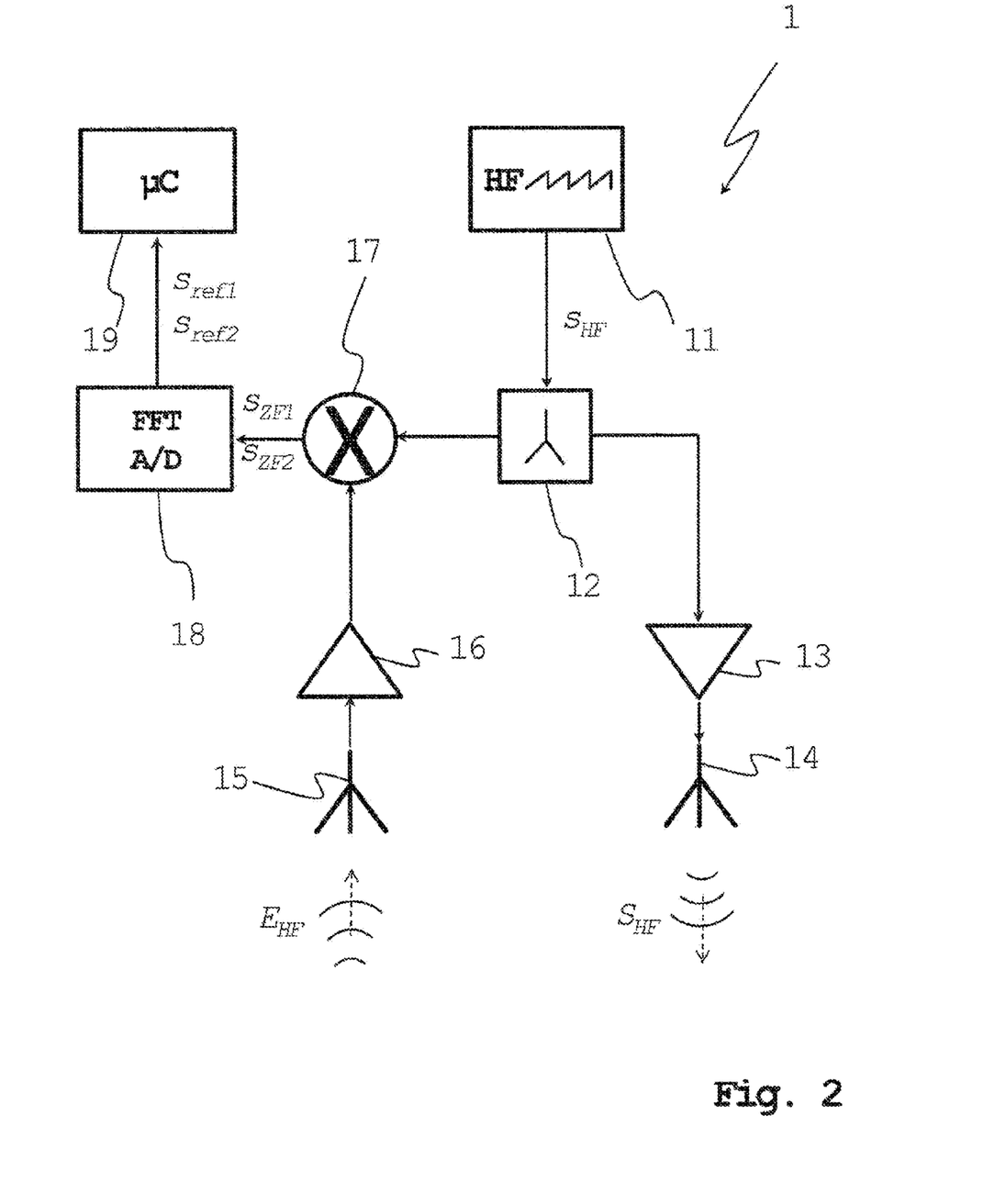
FIG. 2 shows a typical circuit configuration of an FMCW-based fill level measuring device for carrying out the method according to the present disclosure.

FIG. 2 shows a suitable circuit configuration of an FMCW-based fill level measuring device 1 with which the method according to the invention can be implemented for detecting any error state: In order to generate a high frequency signal $s_{HF}$ typical of the FMCW measuring method, the fill level measuring device 1 comprises a corresponding signal generation unit 11. Here the high-frequency signal $s_{HF}$ is designed such that it has a frequency in the microwave range (as standard at 6 GHz, 26 GHz or 79 GHz, but also possible up to over 100 GHz). Here the frequency is not constant but varies periodically within a predetermined frequency difference (in the case of 79 GHz, the frequency difference could be 2 GHz, for example, so that a corresponding frequency would be set between 78 GHz and 80 GHz). In the FMCW method, a sawtooth-shaped (i.e. time-constant within this period) change in the frequency of the high-frequency signal $s_{HF}$ is usual in the case of the periodic change. However, any other form would also be conceivable, for example, a sinusoidal change in the frequency within the respective frequency difference.

The periodicity of the (sawtooth-shaped) change can here be, as is typical of the FMCW method, in an order of up to several 100 MHz. The frequency difference of the high-frequency signal $s_{HF}$ is preferably to be dimensioned as large as possible in this case, since the resolution of the level measurement can be increased by increasing the bandwidth. A generally higher frequency of the high-frequency signal $s_{HF}$ is thus advantageous with regard to the resolution since at higher frequencies a greater—as seen in absolute terms—frequency difference can be implemented.

Once it has been generated the high-frequency signal $s_{HF}$ is fed via a signal splitter 12 (and optionally a transmission amplifier 13) to a transmitting antenna 14. There, the high-frequency electrical signal $s_{HF}$ is converted into the actual radar transmission signal $s_{HF}$ and emitted accordingly.

During measurement operation, a radar received signal $E_{HF}$ is generated by the reflection of the radar transmission signal $s_{HF}$ at the surface of the filling material 3 (and/or at a disruptive body 21 inside the container 2, such as an inflow pipe 21 projecting into the container; see FIG. 1). In the case of a calibration or reference measurement, the radar received signal $E_{HF}$ results from reflection of the radar transmission signal $s_{HF}$ by a predefined reference condition, for example, by a reference object arranged at a known distance d in a measuring path. A further reference condition could also be represented by a precisely known fill level L in the container 2 itself (for example, a known minimum fill level $L_{min}$ which, for example, cannot fall further due to a correspondingly arranged outflow 22; once again, see FIG. 1). In addition, a largely anechoic measuring environment (for example a corresponding absorption chamber) would also be conceivable as a reference condition. In this case, no radar received signal $E_{HF}$ at all is optimally produced.

The radar received signal $E_{HF}$ is received at a receiving antenna 15 of the fill level measuring device 1 and converted back into an electrical signal (which in turn can be optionally amplified by a receiving amplifier 16). This is subsequently mixed with the radio-frequency signal $s_{HF}$, by means of a receiving mixer 17, wherein the high-frequency signal $s_{HF}$ is for this purpose branched off from a signal splitter 12. As a result, an intermediate frequency signal $s_{ZF1}$, $s_{ZF2}$ typical of the FMCW method is generated in each case whose frequency $F_{peak}$ is dependent on the distance d and thus enables measurement of the fill level L. If a suitable transmitting/receiving switch is used, it would of course also alternatively be possible to use a single transmitting/receiving antenna instead of a separate transmitting antenna 14 and receiving antenna 15. This could be realized in a classic manner as a horn antenna. Towards higher frequencies, or if the transmitting and receiving antennas 14, 15 are realized separately, a design as a planar antenna, in particular as a patch antenna or fractal antenna, is however advantageous.

In order to determine its frequency $f_{peak}$ (or, if the radar transmission signal is possibly also reflected at disruptive bodies, a plurality of frequencies $f_{peak}$), the intermediate frequency signal $s_{ZF1}$, $s_{ZF2}$ will usually be subjected by a digitizing unit 18 to a (fast) Fourier transform and thus transferred into easily evaluable (reference) measurement signals $s_{ref1}$, $s_{ref2}$. At the same time an A/D conversion may also be carried out. The frequency spectra hereby resulting are shown schematically in FIG. 3a:

The frequency spectra in each case represent the signal strength or the amplitude A of a corresponding (reference) measurement signal $s_{ref1}$, $s_{ref2}$ as a function of the frequency f. The two frequency spectra shown in FIG. 3a result from two reference measurements carried out one after the other under at least one and the same reference condition, for example, a precisely known minimum fill level $L_{min}$ in the container 2. Depending on the respective reference condition, different characteristic parameters that are contained in all two frequency spectra can be determined on the basis of the two spectra of the corresponding reference measurement signals $s_{ref1}$ $s_{ref2}$. As a characteristic value, for example, a signal maximum $s_{peak}$ or its amplitude $A_{peak}$ and/or its frequency $f_{peak}$ can be determined. The occurrence of the respective signal maximum $s_{peak}$ is dependent on the individual reference conditions and thus could, for example, result from the known minimum level $L_{min}$ of the reference measurement.

Figure 3A:
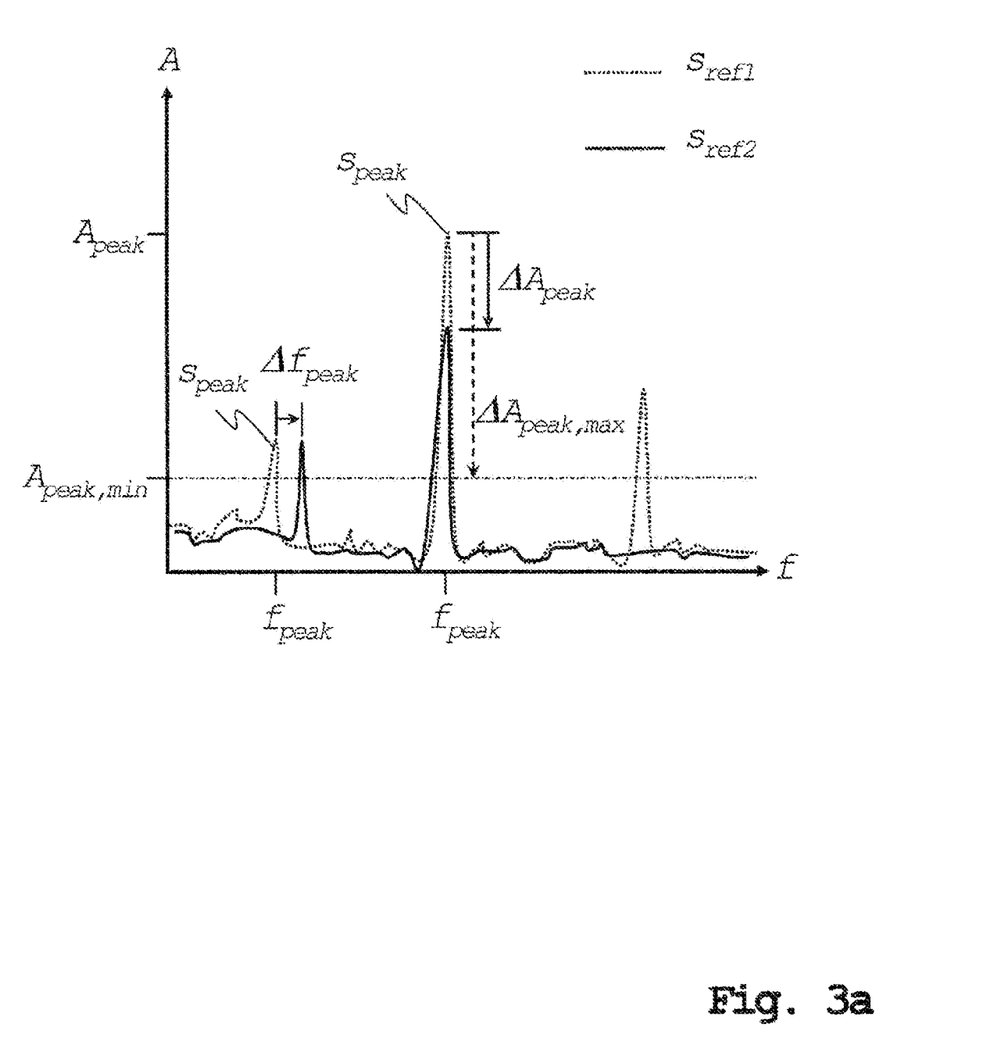
FIG. 3 shows schematic representations for determining characteristic parameters of received signals of an FMCW-based fill level measuring device.

It can be seen from the comparison of the two reference measurement signals $s_{ref1}$, $s_{ref2}$ in FIG. 3a that the characteristic values, i.e. the frequency $f_{peak}$ or the amplitude $A_{peak}$ of the signal maximum $s_{peak}$ does not necessarily remain constant over the period of time between the two reference measurements. For example, a frequency change $\Delta f_{peak}$ or an amplitude change $\Delta A_{peak}$ of the signal maximum $s_{peak}$ may occur instead.

One reason for an attenuation $\Delta A_{peak}$ of the amplitude $A_{peak}$ over the time interval between the two reference measurements could be, for example, a gradual formation of a crust on the transmitting antenna 14 and/or the receiving antenna 15 due to dusty filling material 3. A frequency change $\Delta f_{peak}$, on the other hand, could be attributed to an internal source of error of the fill level measuring device 1, for example, a detuning of the mixer 17.

By carrying out a reference measurement at least twice at a temporally appropriate interval, according to the invention, therefore, not only the at least one characteristic parameter (e.g. the frequency $f_{peak}$ or the amplitude $A_{peak}$ of the signal maximum speak) itself but also its (their) change(s) $\Delta A_{peak}$, $\Delta f_{peak}$ over the time interval between the reference measurements are detected.

The core of the invention is that the change in characteristic value, for example, that of the amplitude $\Delta A_{peak}$, is compared with at least one predefined maximum change in characteristic value $\Delta A_{peak,max}$, $\Delta f_{peak,max}$, which is assigned to the respective characteristic value. In this case, the maximum change in characteristic value $\Delta A_{peak,max}$, $\Delta f_{peak,max}$ represents a threshold value, after which a reliable level measurement is no longer possible and thus an error state of the fill level measuring device 1 has occurred.

In the case of a maximum amplitude change $\Delta A_{peak,max}$, this could be that amplitude value above which the amplitude $A_{peak}$ of the signal maximum $s_{peak}$ in a (reference) measurement signal has dropped down to a minimum amplitude $A_{peak,min}$, from which the signal maximum $s_{peak}$ can no longer be unequivocally recognized on account of the signal-to-noise ratio. If, however, a maximum change in frequency $\Delta f_{peak,max}$ is defined as the maximum change in characteristic value, this could be a maximum permitted change in frequency, up to which a defined minimum resolution of fill level measurement is guaranteed and accordingly no error state yet triggered.

If, on the other hand, the maximum change in characteristic value $\Delta A_{peak,max}$, $\Delta f_{peak,max}$ is exceeded, this will be detected by a corresponding evaluation unit 19 (see FIG. 2) and, if appropriate, forwarded to the superordinate unit 4.

Figure 3B:
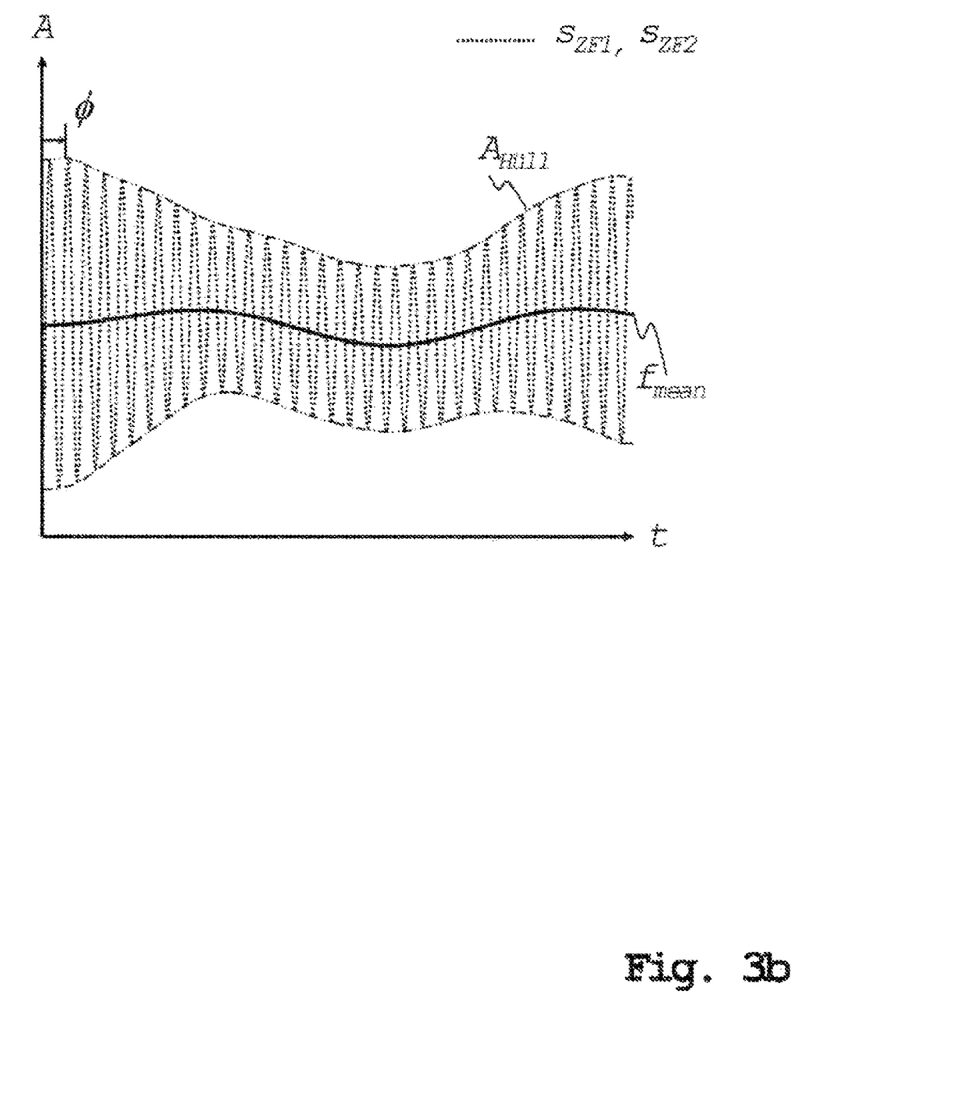

That, within the meaning of the invention, not only the intermediate frequency signals $s_{ZF1}$ $s_{ZF2}$, transformed into frequency spectra can be used for the determination of the characteristic parameter $A_{peak}$, $f_{peak}$ in reference measurement but also "raw" intermediate frequency signals $s_{ZF1}$ $s_{ZF2}$ themselves, can be seen from FIG. 3b. It also appears that the characteristic parameter here can be an envelope $A_{Hüll}$ (i.e. the amplitude characteristic), a low-frequency interference $f_{mean}$ or a phase $\phi$ of the intermediate frequency signal $s_{ZF1}$, $s_{ZF2}$ (in relation to the high-frequency signal $s_{HF}$). These can change their values due to aging of the components. Thus, for example, aging affects the attenuation at different frequencies and thus changes the envelope $A_{Hüll}$.

Figure 4:
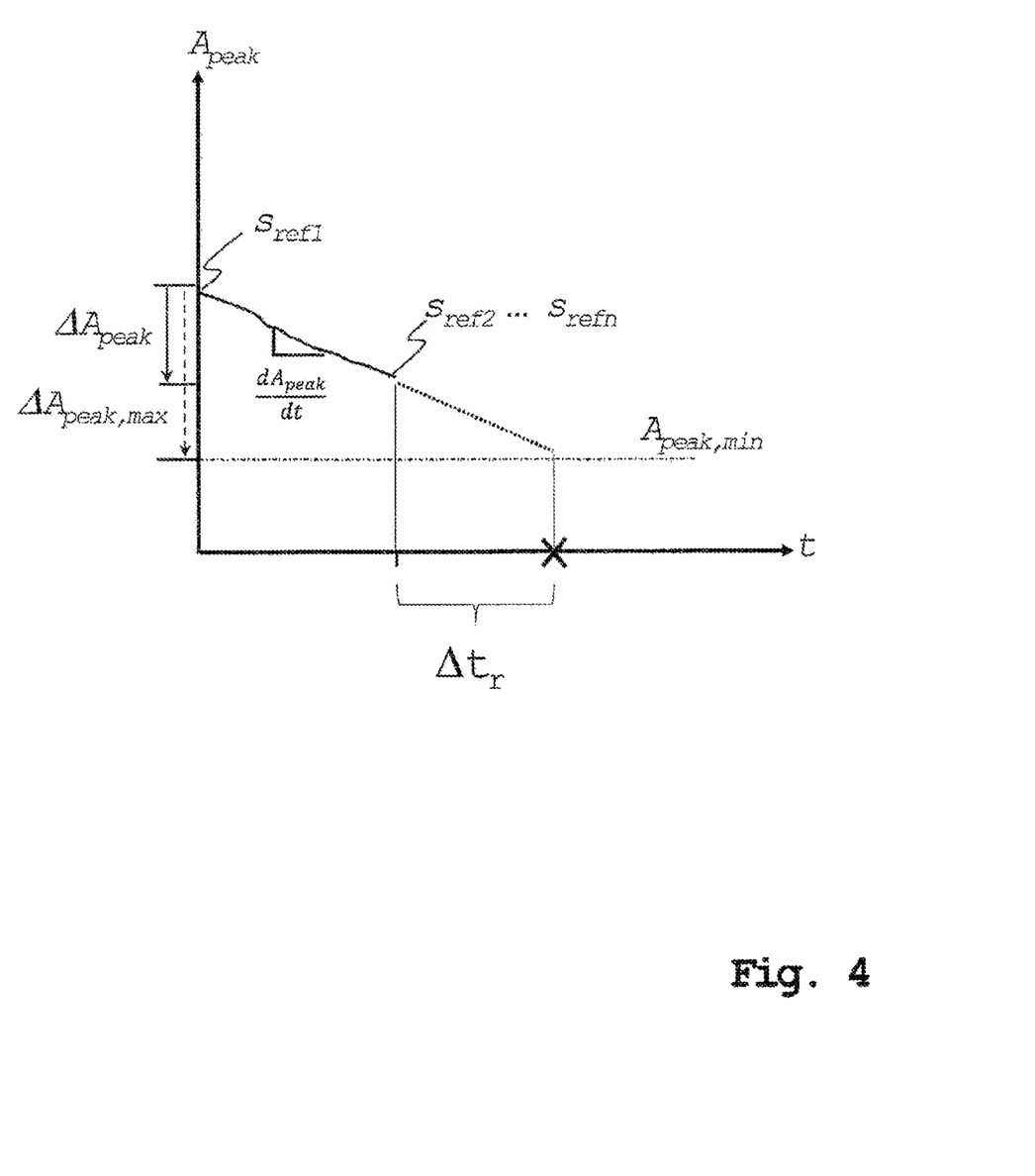
FIG. 4 shows a regression of a characteristic parameter for determining the expected remaining operating duration of an FMCW-based fill level measuring device.

FIG. 4 illustrates a development of the method according to the invention. This development is in other words based on the idea of approximating a remaining time period $\Delta t_r$ by determining the change in at least one specific characteristic parameter via at least two or more reference measurements, up to the duration at which the respective maximum change in characteristic value is likely to be exceeded and the error state of the fill level measuring device 1 will thus occur. The precondition for this is that the change in the corresponding characteristic parameter at the time of currently the last reference measurement in each case has not yet exceeded the maximum change in characteristic value.

In FIG. 4 this development is illustrated by way of example on the basis of the amplitude change $\Delta A_{peak}$ of the signal maximum $s_{peak}$. On the basis of the amplitude change $\Delta A_{peak}$, which was detected over the period between at least two reference measurements on the basis of the corresponding reference measurement signals $s_{ref1}$, $s_{ref2}$, ..., $s_{refn}$, a change function $dA_{peak}/dt$ is created. For this purpose, a regression of the amplitude change $\Delta A_{peak}$ can be carried out. In the exemplary embodiment shown, a linear regression is used for this, since here the amplitude decrease $\Delta A_{peak}$ is approximately constant overtime. An amplitude $A_{peak}$ that is constantly decreasing over time can be caused, for example, by a continuous increase in the crusting on the transmitting antenna 14 and/or the receiving antenna 15.

In general, however, the choice of a suitable regression type (i.e. exponential, logarithmic, etc. as well) within the meaning of the invention is not limited to linear regression, but is rather made to depend on the individual course of the change in a particular characteristic parameter (to find a suitable regression type and/or to perform the actual regression, for example, the least square method could be used).

Following the creation of the change function $dA_{peak}/dt$, the expected remaining operating duration $\Delta t_r$ is thereby approximated (on the basis of the amplitude $A_{peak}$ at the time of the last reference measurement) until the amplitude change $\Delta A_{peak}$ becomes so great that the amplitude $A_{peak}$ will have fallen below the minimum amplitude $A_{peak,min}$. By means of this development of the invention, therefore, an error state according to the principle of "predictive maintenance" can already be detected in advance.

The invention claimed is:

1. A method for detecting an error state in a fill level measuring device configured to operate according to the frequency-modulated continuous wave (FMCW) measuring principle, the method comprising:
  measuring a first reference measurement signal under at least one predefined reference measurement condition using a FMCW-based fill level measuring device;
  determining at least one characteristic parameter of the first reference measurement signal;
  measuring at least one second reference measurement signal under the at least one predefined reference measurement condition using the FMCW-based fill level measuring device;
  determining a change in at least one characteristic value based on at least the first reference measurement signal and the at least second reference measurement signal;
  identifying an error state when the change in the at least one characteristic value exceeds a predefined maximum change in the characteristic value;
  generating a temporal change function at least based on the at least one characteristic value and the change in the at least one characteristic value; and
  when the change in the at least one characteristic value does not exceed the predefined maximum change in characteristic value, calculating a remaining operating duration before the predefined maximum change in characteristic value will be exceeded based on the temporal change function.

2. The method of claim 1, wherein the at least one characteristic parameter includes an amplitude, a frequency of a signal maximum of the respective reference measurement signal, an envelope of the amplitude, a phase position and/or a frequency of a low-frequency interference of a respective intermediate frequency reference measurement signal.

3. The method of claim 1, wherein the at least one predefined reference measurement condition is a fall below a minimum fill level.

4. The method of claim 1, wherein the temporal change function is generated from a regression analysis.

5. The method of claim 4, wherein the method of least squares is used to perform the regression analysis and/or to determine an appropriate type of regression.

6. The method of claim 1, further comprising, subsequent to determining the change in the at least one characteristic value based on at least the first reference measurement signal and the at least second reference measurement signal and when the at least one predefined reference measurement condition again occurs, determining a further reference measurement signal.

7. The method of claim 1, further comprising:
generating a first correction curve using the first reference measurement signal;
generating a second correction curve using the second reference measurement signal; and
determining the change in the at least one characteristic value based on the first correction curve and the second correction curve.

8. A fill level measuring device, comprising:
a signal generation unit configured to generate a radar transmission signal;
a transmitting antenna and/or a receiving antenna adapted to transmit the transmission signal and/or to receive a radar received signal;
a mixer configured to generate an intermediate frequency signal by mixing of the transmission signal with the received signal; and
an evaluation unit configured to:
determine a measurement signal and/or a reference measurement signal using the intermediate frequency signal;
determine a fill level from the measuring signal;
indicate an error state of the device by:
measuring a first reference measurement signal under at least one predefined reference measurement condition;
determining at least one characteristic parameter of the first reference measurement signal;
measuring at least one second reference measurement signal under the at least one predefined reference measurement condition;
determining a change in at least one characteristic value based on at least the first reference measurement signal and the at least second reference measurement signal; and
indicating the error state when the change in the at least one characteristic value exceeds a predefined maximum change in the characteristic value; and
when the change in the at least one characteristic value does not exceed the predefined maximum change in characteristic value, determine a remaining operating duration by:
generating a temporal change function at least based on the at least one characteristic value and the change in the at least one characteristic value; and
calculating the remaining operating duration before the predefined maximum change in characteristic value will be exceeded based on the temporal change function.

9. The device of claim 8, wherein the at least one characteristic parameter includes an amplitude, a frequency of a signal maximum of the respective reference measurement signal, an envelope of the amplitude, a phase position and/or a frequency of a low-frequency interference of a respective intermediate frequency reference measurement signal.

10. The device of claim 8, wherein the at least one predefined reference measurement condition is a fall below a minimum fill level.

11. The device of claim 8, wherein the temporal change function is generated from a regression analysis.

12. The device of claim 11, wherein the method of least squares is used to perform the regression analysis and/or to determine an appropriate type of regression.

13. The device of claim 8, wherein the evaluation unit is further configured to:
generate a first correction curve using the first reference measurement signal;
generate a second correction curve using the second reference measurement signal; and
determine the change in the at least one characteristic value based on the first correction curve and the second correction curve.

* * * * *